United States Patent Office 3,565,799
Patented Feb. 23, 1971

3,565,799
METHOD FOR PHYSICAL AND/OR CHEMICAL TREATMENT IN LIQUIDS OR GASES BY TREATMENT AGENTS IN GRANULAR FORM
Erich Kieschnick, Taunusstrasse 19, and Werner Lux, Taunusstrasse 21, both of Butzbach, Hesse, Germany, and Max Schultz, Moltkestrasse 20, Giessen, Hesse, Germany
Filed Dec. 8, 1967, Ser. No. 689,750
Claims priority, application Germany, Dec. 9, 1966, P 40,966
Int. Cl. B01d 23/10
U.S. Cl. 210—35          18 Claims

ABSTRACT OF THE DISCLOSURE

Liquid or gas to be treated is brought into bodily contact with a treatment agent in granular form. Means are also provided for regenerating the treatment agent after it has been more or less exhausted or contaminated. In case the regeneration agent is directed through the packing of granular material in an upward direction whirling and re-arrangement of the treatment agent which is in granular form is prevented by a weighting or loading medium also in granular form, the latter material being laid onto the upper surface of the granular treatment agent. After regeneration of the treatment agent has taken place the granular weighting or loading material can be flushed out again from the respective treatment apparatus, which is preferably a column.

BACKGROUND OF INVENTION

The physical, physical/chemical or chemical treatment of liquids and gases is normally carried out in contact with granular matter of all kinds, for example, drying agents, adsorption agents, matter exchange agents, temperature exchange agents, catalysts, packings, ion-exchanging matter, filtering matter, biological treatment material, neutralization material and so forth. All these materials in the following description will be designated "treatment agents."

Normally in known methods or apparatus for such treatment the liquid or the gas to be treated is conducted through layers of a more or less granular treatment agent, the particles of which agent are at rest (as opposed to whirling around). If, after some time of treatment the treatment agent itself has become exhausted or contaminated, the treatment agent is regenerated or rinsed, cleaned or flushed with suitable liquids or gaseas in order to prepare the treatment material for the next operation, i.e., to treat respective gases or liquids. The gases or liquids which are used for regenerating the treatment agent after it has become more or less exhausted or contaminated will be designated "regeneration agents" in the following description. While in certain steps of respective methods, for example during back-flushing, a whirling or rearrangement of the treatment agent by means of the regeneration agent is desirable in other method steps, for example during the treatment proper of a liquid or gas which is to be cleaned or the like by the treatment matter, such whirling or rearrangement of the granules of the treatment agent should be avoided in order to achieve a high efficiency. However, the granules must be allowed to shrink or swell. When using treatment agents in granular form in the so-called counter current method, the liquids or gases to be treated go through the treatment agent in one direction, i.e., downwards, and the regeneration agent is forced in the other direction, i.e., ascentially through the treatment agent. The treatment agent is supported by a plate having openings, for example, a jet plate. In some cases the size of the granules of the treatment agent decreases from such jet plate upwardly.

In the prior art, whirling or rearrangement of the treatment agent by the regeneration liquid or gas moving upwardly is prevented by an aperture plate which is adjustably arranged above the column of the treatment agent in order to allow swelling and/or shrinking of the treatment agent during the various steps of the method in general. This adjustable plate in the prior art must be adjustable in order to allow a 100% increase of the treatment agent if same is swelled and thus this leads to a rather complicated mechanism for the adjustable plate. A further disadvantage of the prior art arrangement comprising the adjustable plate is to be seen in the fact that it does not reliably operate under all conditions.

It is a primary object of the invention to provide new and improved method for preventing whirling up of a treatment agent if a liquid or gas is forced through it in a substantially upward direction.

In its most general view the invention consists in providing a downward force generating mass or material upon the upper surface of the granular treatment agent in order to prevent whirling and rearranging of the treatment agent granules during forcing liquid or gas in an upward direction. According to a more specific idea this "weighting or loading matter" is also of granular consisting and can be flushed in position to hold down the granules of the treatment agent and furthermore can be flushed away from the treatment agent.

According to a further specific feature of the invention the loading or weighting mass can be arranged in layers between other layers of the treatment agent. According to still another feature of the invention the weighting and loading material can be finely distributed or intermixed with the granules of the treatment agent to be held down.

Further objects and features of our invention will become apparent from the following description of several embodiments of the invention.

Figure 1:
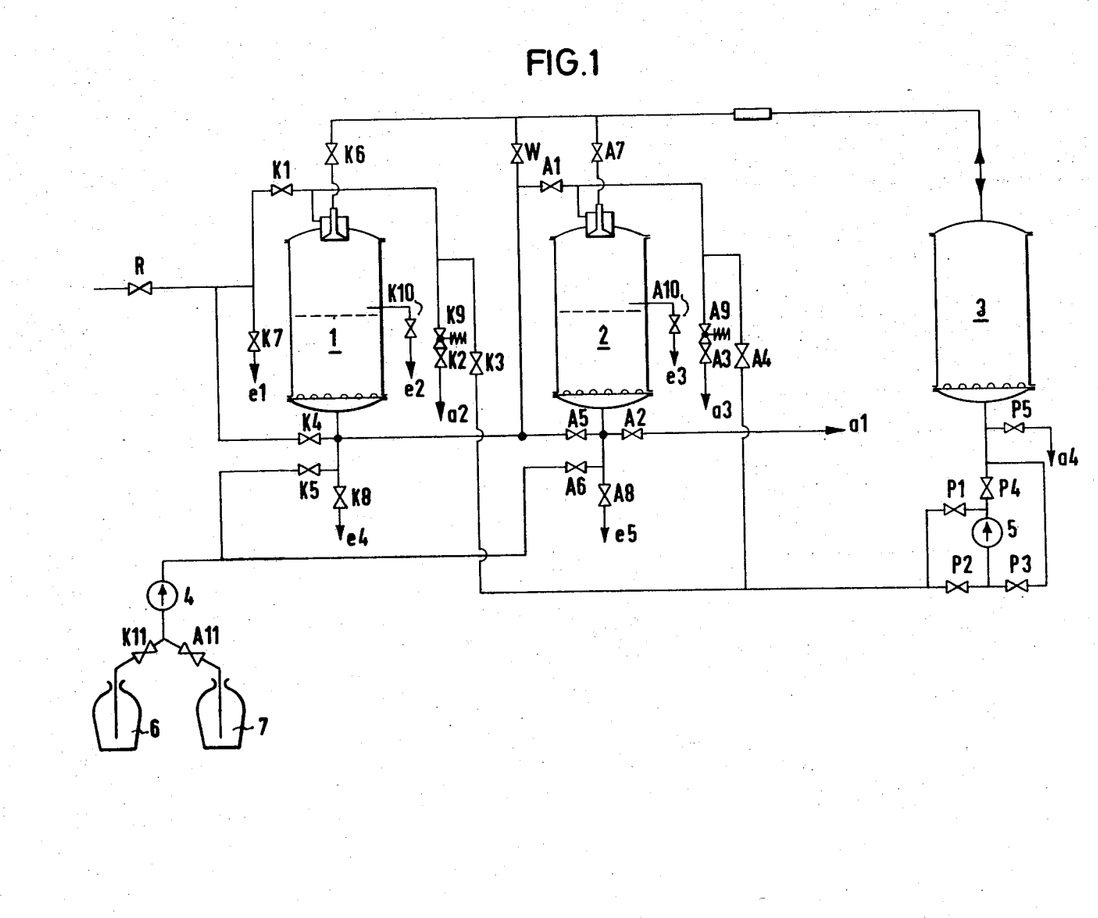
FIG. 1 diagrammatically shows a plant for desalting of water by means of a cation exchanger and an anion exchanger, which exchangers are regenerated for re-loading in a counter current direction.

The desalting plant of FIG. 1 comprising a cation exchanger 1 and an anion exchanger 2, both exchangers being filled to approximately half their height as indicated by the dashed lines in FIG. 1 with the exchange agent or material, i.e., the "treatment agent." The plant further comprises a storage container 3 for weighting and loading material and a flushing pump 5 which is adapted to flush weighting and loading material out of container 3 into each exchanger and vice versa. Dosing pump 4 which can be connected either to a container 6 containing hydrochloric acid or to a container 7 containing sodium lye serves for introducing these "regenerating agents" into the respective exchanger.

The successive steps of operation of the plant shown in FIG. 1 are controlled by means of valves K, A and P. Crude water comes in via valve R. This crude water can also be used for diluting and washing out the regeneration agent and for rinsing of the treatment agent and eventually of the weighting and loading material. The desalted water is extracted at $a1$, the used up regeneration agent is extracted $a2$ or $a3$, respectively, while rinsing water may be extracted at $a4$. Extracting of samples is possible at $e1$, $e2$, $e3$, $e4$ and $e5$. Operation of the plant in substance is as follows:

During an exchange operation crude water is directed successively through exchangers 1 and 2, the path of the water being the following: Valves R and K1—exchanger 1 in downward direction—valve A1—exchanger 2 in downward direction—valve A2—extraction at $a1$.

For regenerating the cation exchanger 1 the upper part of the latter is filled with weighting and loading material which is flushed by water from container 3 into the exchanger. For this purpose after closing of valves K1, A1 and A2 the valves P2, P4, K6, K3 are opened and pump 5 is switched into operation. This latter pump 5 circulates the water present in the circuit via the open valves which thus transports the weighting and loading material from container 3 into exchanger 1.

The next steps consists in opening valves K4 and K2 in such a manner that some crude water is moved through exchanger 1 in upward direction. Then valves K5 and K11 are opened and dosing pump 4 is switched into operation. This allows hydrochloric acid from container 6 to be introduced into the said crude water current and exchange agent (treatment agent) within exchanger 1 is thus regenerated. Regeneration is finished by bringing pump 4 to a stop and closing valves K5 and K11, whereupon the still existing crude water current washes the remaining acid out of the exchanger and replaces this acid. The next step is closing valves K4 and K2 again.

During regeneration and washing out the exchange or treatment agent is held compactly packed and the granules of the treatment agent are prevented from relative movement or whirling by the weighting and loading material which rests upon the treatment agent. The pressing force exerted by the weighting material is increased by allowing pump 5 to run continuously. The following step is opening pump valves P1 and P3 and closing valves P2 and P4, which results in a reversal of the current direction within the flushing circuit, so that the weighting material is transferred from exchanger 1 into container 3. When this step is finished pump 5 is switched to a stop and the circuit is closed by closing valves K3, K6, P1 and P3.

Now and then the exchanger agent (treatment agent) is return flushed or return rinsed in order to transport away adhering dirt or sludge following loading of the exchanger agent. This is done with crude water which after closing of valves K1 and A1 and opening of valves K4, K6 and P5 runs through exchanger 1 in the upward direction and which is extracted at $a4$. The next step then would be a regeneration with an increased amount of hydrochloric acid. As during back-flushing the exchanger agent is not loaded with the weighting material the exchanger agent is whirled up by means of the back-flushing current, so that the dirt particles can be efficiently removed.

Regeneration and flushing for the anion exchanger 2 is achieved in the same manner as described above in connection with cation exchanger 1. In this case the respective valves and the pumps are operated as described above while for regeneration dosing pump 4 is connected to container 7 and sodium lye is introduced in exchanger 2.

Figure 2:
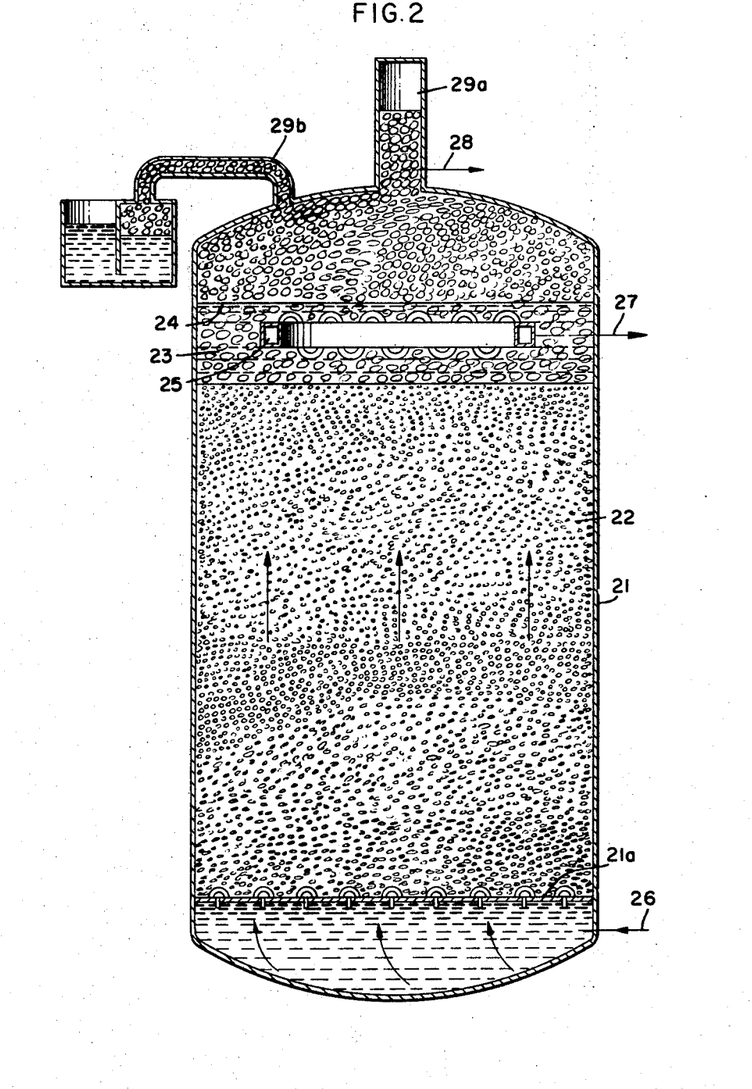
FIG. 2 shows in vertical section an exchanger in the form of a column.

In the embodiment shown in FIG. 2 an exchanger with an ascensional current direction container 21 comprises a jet plate 21$a$ at the lower portion thereof. Exchanger agent (treatment agent) 22 is arranged on jet plate 21$a$ and above treatment agent 22 weighting and loading material 23 is arranged so that the container is nearly completely filled. The extraction system 25 is arranged within the weighting and loading material, the latter additionally being pressed downward by an ascending pipe 29$a$ and/or liquid seal 29$b$. The liquid level 24 is lowered into the vicinity of extraction system 25 in order to increase the downwardly directed force onto agent 22 by means of low buoyancy of the weighting and loading material.

Crude water enters the exchanger at 26, is directed in upward direction in which the size of the granules of material 22 decreases. Within the weighting material consisting of larger sized particles, water is extracted by means of extraction system 25 and piping 27 having respectively large cross-sections. The downwardly directed pressing force onto the exchanger agent depends upon the weight and the buoyancy of the weighting material. By means of adjusting level 24 a fine control of the downwardly pressing force is possible. If level 24 is moved upwardly this increases buoyancy of the weighting material and thus decreases the downwardly directed pressing force exerted by the weighting material onto the treatment agent 22.

In order to regenerate exchanger agent 22 regeneration agent is introduced via tubing 27. Regeneration agent flows downwardly in a direction in which the size of the granules increases through the exchanger agent which results in a high ion concentration of the active fine layer in the upper part of the exchanger while in the lower layers within agent 22 the concentration is somewhat lower. At 26 regeneration agent is then extracted. After resetting the respective valves (not shown) into normal operation and introducing crude liquid at 26 the water having a high salt concentration first meets the exchange agent having a low ion concentration and a high diffusion resistance. Corresponding to the decreasing salt concentration within the upwardly directed current the ion concentration within the exchange agent increases while the diffusion resistance continuously decreases. This way of making up liquids is at present the most economical one. Furthermore, the dirt contained within the crude liquid is already retained in the lower layers so that more crude liquid can be made up between two successive flushing steps.

In order to allow back-flushing of the exchanger agent for washing out the sedimentations in the spaces between the granules preparatory, the weighting or loading material is flushed away via tubing 28, for example hydraulically, for which purpose flushing liquid via tubing 27 and extraction system 25 is introduced. After back-flushing of the exchanger or treatment agent 22 in the inverse manner, the weighting or loading material is flushed in again via piping 28.

Figure 3:
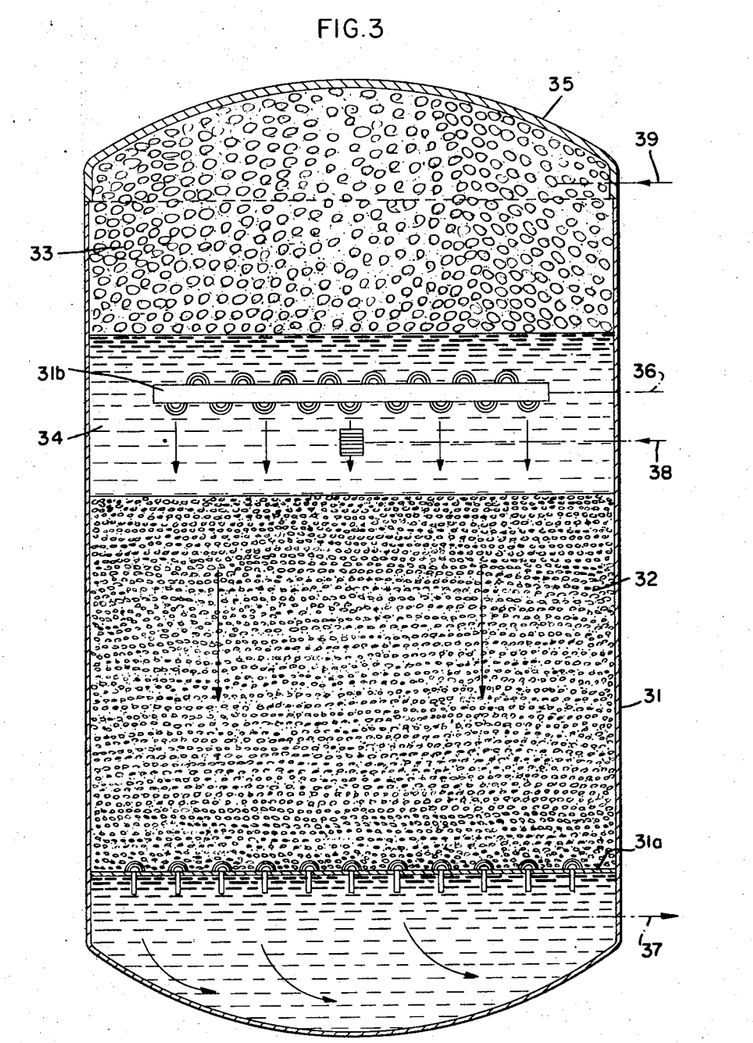
FIGS. 3 and 3a show diagrammatically in vertical section an exchanger which is loaded in downwardly directed current (FIG. 3) and which is regenerated by an upwardly moved regeneration agent (FIG. 3a)
Figure 3A:
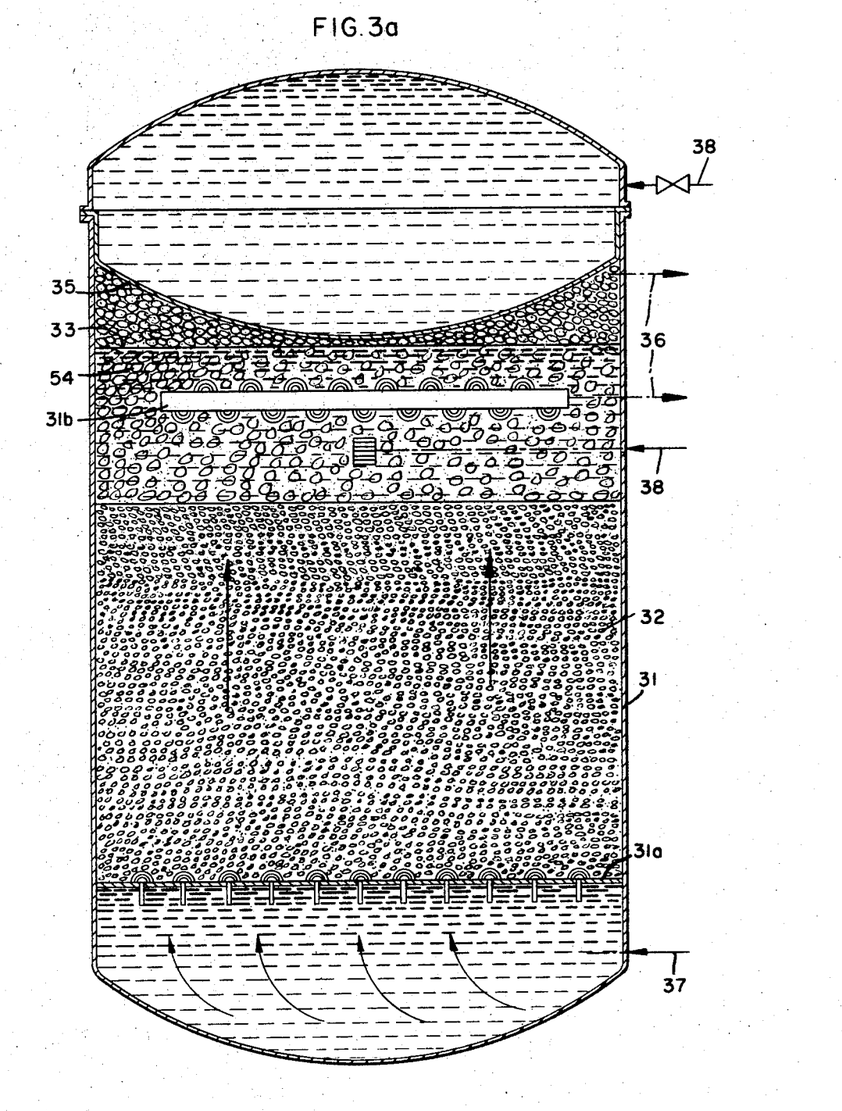

In the embodiment for an exchanger shown in FIGS. 3 and 3$a$ in which the fluid to be treated moves downwardly through treatment agent 32 and in which during regeneration the regeneration agent moves upwardly, said exchanger agent 32 is supported within the lower part of column or container 31 on a jet plate 31$a$. Above agent 32 there is provided space 34 in order to allow for swelling of the agent. Within space or region 34 an inlet system 31$b$ for crude water and a pressurizing water inlet and outlet 38 are arranged. Within the head of the container a diaphragm 35 is attached which can be biased and released via tubing 39.

During treatment of the fluid by means of treatment agent 32 (FIG. 3) crude liquid enters at 38 and is moved through liquid filled space 34 in a descending current through exchange or treatment agent 32, leaving column 31 via piping 37. Any alterations of the volume of treatment agent 32 are compensated or received by means of space 34. Granular weighting or pressurizing material 36 is afloat on the liquid within space 34, during normal operation with no liquid flowing through weighting or loading material 33.

On regeneraton, however, according to FIG. 3a, diaphragm 35 is biased by means of a liquid or a gas via tubing 39 in a downward direction which presses the weighting or pressurizing material 33 onto the treatment or exchanger agent 32. Regeneration agent enters at tubing 37, ascends through the exchanger agent and is extracted via extraction system 31b and tubing 36. After having finished with the regeneration step by means of introducing liquid via tubing 36 and by releasing diaphragm by putting away material above the same through tubing 39, the weighting or loading material 33 is again made to float on the liquid contained in space 34. In case back-flushing of the treatment agent 32 is desired the weighting or loading material can be flushed out of container 31 by means of system 31b and tubing 38. After having finished back-flushing of the exchanger agent, the weighting and loading material on the inverse path is again flushed into the container.

By means of the indirect action of the diaphragm via the weighting and loading material onto the treatment agent the vertical movement of diaphragm and weighting and loading material is minimized and the undesired whirling and/or re-arrangement of the granules of the treatment agent is prevented.

Figure 4:
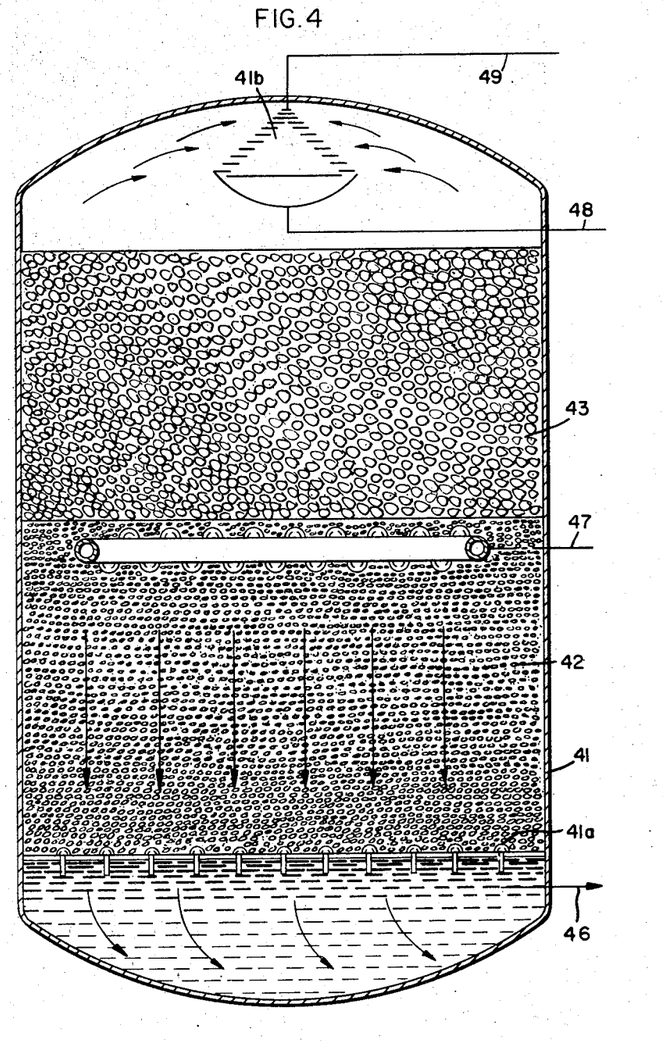
FIG. 4 shows in diagrammatical vertical section a filter in which the material to be filtered flows downwardly and which comprises a weighting or loading material distributor.

In FIG. 4 there is schematically depicted an embodiment for a filter in which the fluid is moved downwardly during treatment by means of treatment agent 42. The packing or loading material 43, which is adapted to exert a downwardly directed force onto treatment agent 42, can be flushed back and furthermore operates as the distributing means for the incoming fluid which is to be treated by treatment material 42. The packing particles 43 consist of resiliently compressible matter, which particles can be kneaded by means of a pulsing current of liquid and gas in order to remove adhering dirt particles or the like.

During normal operation the liquid which is to be treated enters via piping 48 into the container and within this contaner the liquid passes packing or downward force exerting material 43. Within packing 43 the liquid can be partly gassed or degassed and the liquid leaving material 43 enters treatment agent 42 in which the liquid is, for example, filtered. The filtered liquid then leaves container 41 via tubing 46. If flushing or rinsing of treatment agent 42 is desired, the packing particles 43 are hydraulically or pneumatically extracted via system 41b and tubing 49, whereupon treatment agent 42 is flushed back.

Packing and pressing material 43 within a respective tank (not shown) can be treated by a pulsing liquid and gas current, in which case liquid is introduced into the tank which flushes out freed dirt particles. A pulsing gas current compresses the packing particles and also allows them to re-expand which facilitates removing of dirt and the like. The packing particles may consist of foamed plastic material or rubber-like material. It is also possible to have both currents, i.e., the liquid current, and the gas current to be of pulsating character. Cleaning of the packing particles by means of a pulsing liquid and gas current can also be made within the treatment container 41 itself.

Corresponding to the effect achieved by means of the distributing feature it is possible to automatically control the level of the liquid and thus the active surface of the unsubmerged packing particles.

If the treatment agent is an agent which must be regenerated sometimes, the respective regenerative agent is introduced via tubing 46 and, after having passed treatment agent 42, the regenerative agent is extracted via tubing 47. Extraction means are shown at 45. During this period the packing particle mass should rest with its full weight on the treatment agent for which purpose the water level is kept as low as possible.

Figure 5:
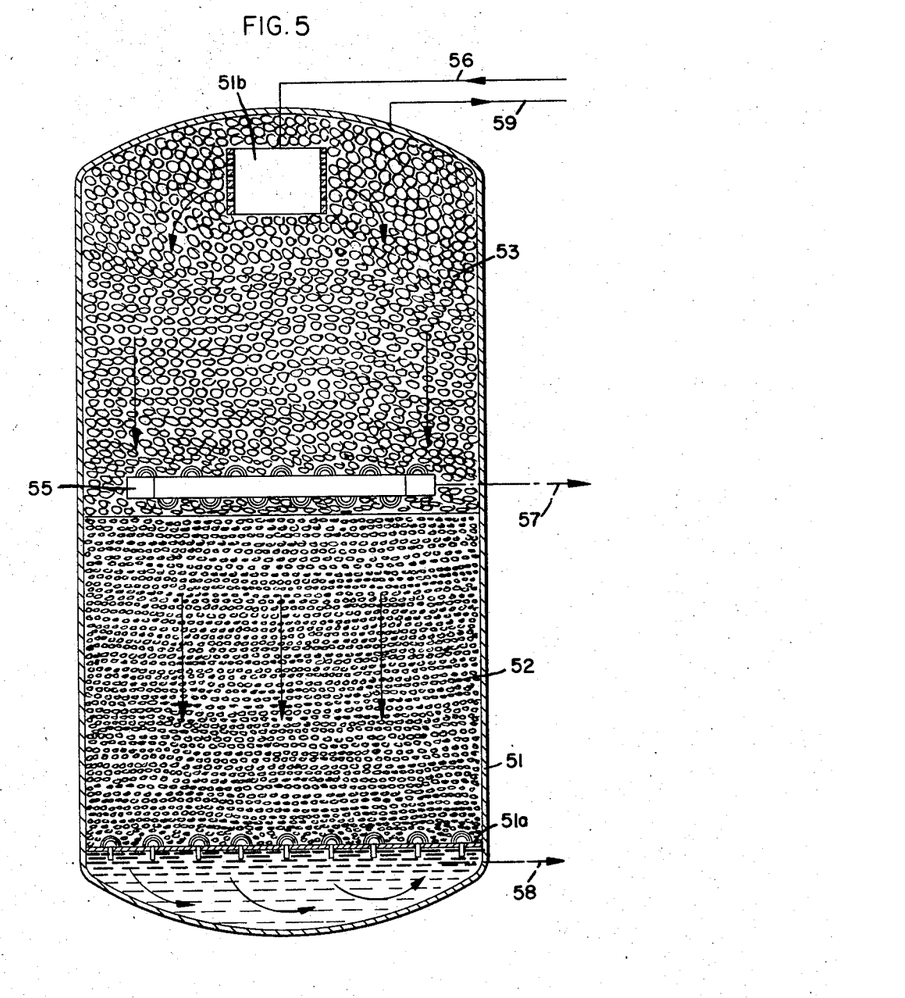
FIG. 5 shows diagrammatically in vertical section a two-layer downward current exchanger with filtering means for the weighting and loading material.

In FIG. 5 a two-layer downward current exchanger is shown in vertical section. The pressurizing and weighting material 53 simultaneously acts as a filter. Crude liquid enters distributor 51b within the head of container or column 51 via tubing 56 and passes downwardly through pressurizing material filter 53 and subsequently exchange or treatment agent 52. After having passed agent 52, the liquid passes jet plate 51a and then it is extracted via tubing 58 from container 51. The material 53 which acts as a filter and as loading means to exert a downward directed force on material 52 consists of resiliently compressable matter, for example, foamed polystyrol, foamed polyvinyl chloride, foamed rubber or the like, in order to have the eventually swelling and shrinking exchange agent 52 always compactly packed.

If regeneration is desired, regeneration agent is inserted via tubing 58 into container 51 whereafter the regeneration agent passes exchange agent 52 in an ascending current, and leaves system 55 via tubing 57. If back-flushing (including whirling of the particles of agent 52) is desired, material 53 can be flushed out of container 51 by means of a flushing current which enters at tubing 57 and leaves the conatiner via tubing 59. By this means the necessary space for back-flushing of material 52 (including heavy whirling of its particles) becomes available.

Figure 6:
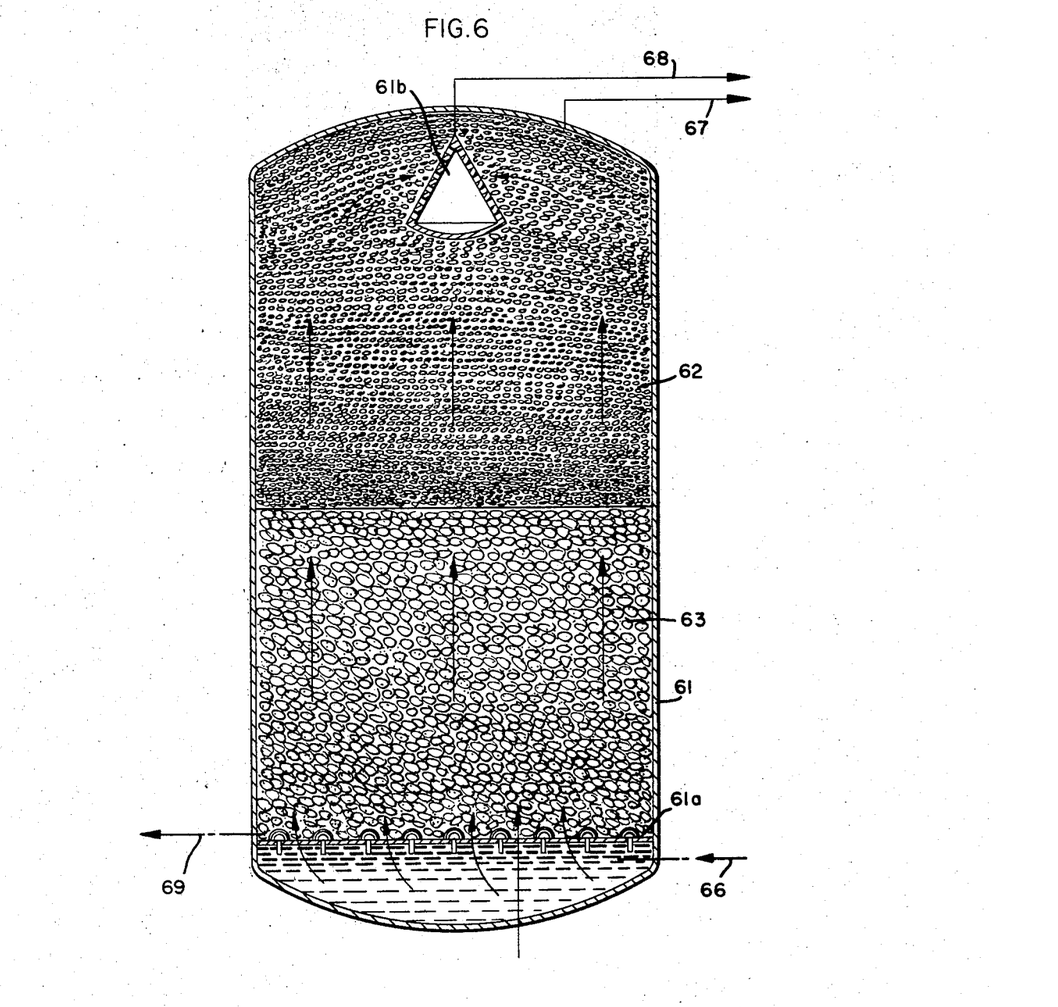
FIG. 6 shows in diagrammatical vertical section a two-layer exchanger with upward movement of the treated liquid or gas having a filter for the weighting or loading material.

In FIG. 6 a further embodiment of an exchanger according to the invention is shown. This exchanger is an ascending current exchanger and the weighting and loading material 62, which also serves as a filter, consists of relatively heavy resiliently deformable material such as rubber, latex, rubber-like elastic plastics or the like which can compensate for volume changes of exchange agent 62.

Crude liquid enters via tube 66 into the bottom part of container 61 and then traverses jet plate 61a in order to enter pressurizing and filtering material 63 before flowing through the exchange agent 62 in an ascending current. In which direction, also, the size of the particles decrease which for the filter part 63 as well as for the agent part 62 results in giving the current an optimal direction.

For back-flushing purposes the pressurizing material underneath the treatment agent 62 is extracted via tube 69 which leads from below the container 61 above jet plate 61a; accordingly, treatment agent 62 descends and the descended treatment agent 62 is then subjected to back-flushing. After back-flushing via tube 66, such an amount of liquid is introduced that the treatment agent or exchanging mass 62 is afloat and pressed against the head wall of container 61. Substantially the pressurizing material is again flushed into the container below the exchanging agent.

Figure 7:
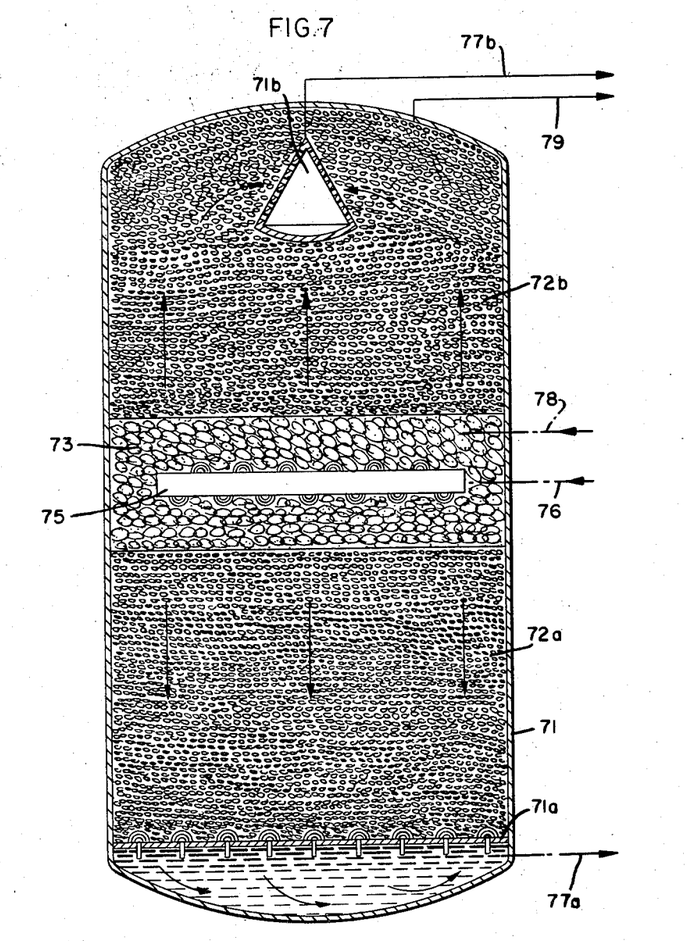
FIG. 7 shows a two-current exchanger comprising central weighting and loading means.

In FIG. 7 a two-current exchanger is shown in which the pressure exerting material is arranged medially between two exchange agent zones. Exchange or treatment agent 72b is able to be afloat and lower treatment agent mass 72a consists of an exchange material which has negative buoyancy and thus will sink down. The two exchange masses are passed by the fluid to be treated in two directions, namely the upper one (72b) in upward direction and the lower one (72a) in descending direction.

Crude water is introduced via piping 76 into container 71 and is divided in one upwardly directed current and one downwardly directed current. The lower current passes in downward direction, the exchange mass 72a having negative buoyancy and leaves container 71 via tubing 77a. The numeral 71a designates a jet plate similar to the one described earlier with respect to other embodiments of the invention. The upper current of fluid to be treated passes through exchange mass 72b which has positive buoyancy and leaves container 71 via tubing or piping 77b. The pressure or force exerting mass 73 has properties enabling it to compensate shrinking and/or swelling of the two exchange masses 72a and 72b. After having flushed out the pressurizing material, both exchanger masses can be back-flushed.

Figure 8:
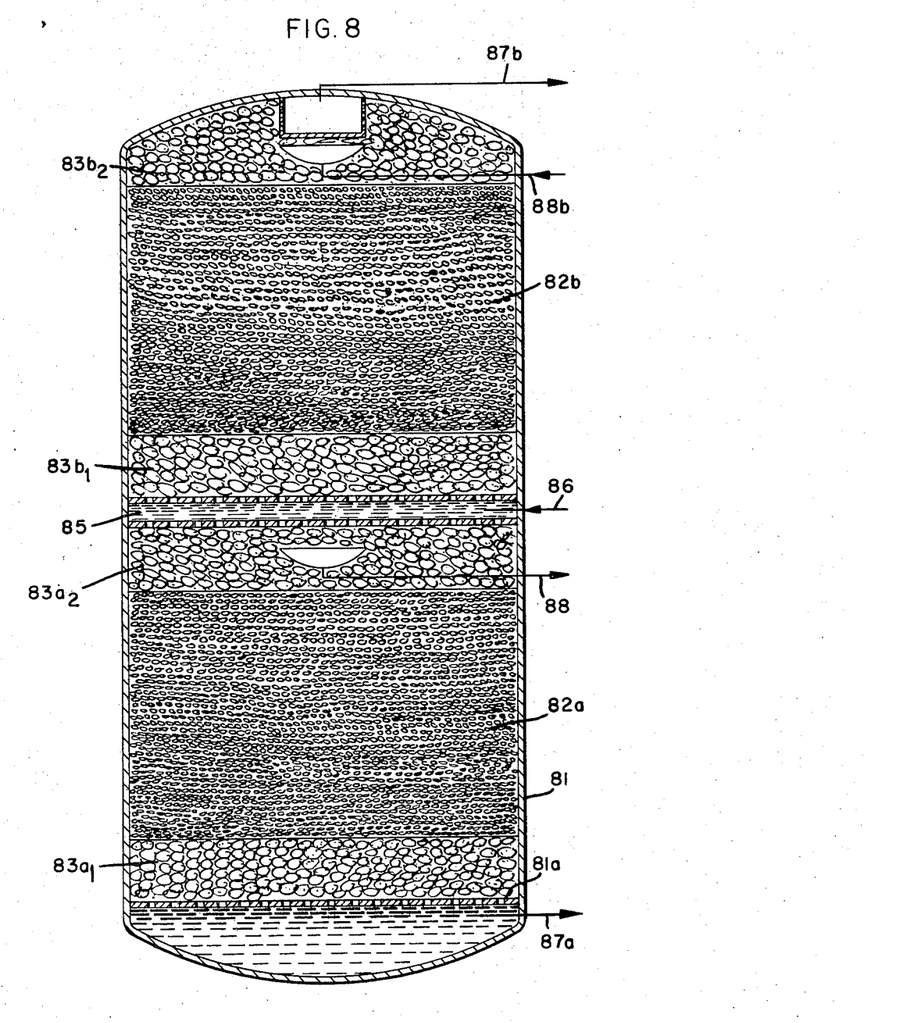
FIG. 8 shows in diagrammatical vertical section a further embodiment of a filter having a separating plate and intermediately arranged weighting and loading means.

In the two current exchanger shown in FIG. 8 the lower exchanger mass 82a is interposed between two layers of pressurizing material $83a_1$ and $83a_2$ and the upper exchange material 82b is interposed between two layers of pressurizing material $83b_1$ and $83b_2$. Intermediate between the pressurizing masses $83a_2$ and $83b_1$ a separating plate supporting the upper masses is arranged. This plate has relatively large openings or slots therein because the plate is arranged in a pressurizing material having relatively large sized particles, so that any plugging is prevented.

The liquid or the gas to be treated enters via tubing 86 into container 81 and is divided into two currents, one going upwardly and one going downwardly. The upper current passes masses $83b_1$, then 82b and then $83b_2$ whereupon it leaves the container via tubing 87b. The lower current passes masses $83a_2$, 82a and $83a_1$, then apertured plate 81a, leaving container 81 via tubing 87a. If the exchanger masses or agents 82a and 82b are to be back-flushed, pressurizing masses $83a_2$ and $83b_2$ can be flushed out of the container via tubing 88a and 88b, respectively.

The above description of various embodiments shows the general principle of the invention: In order to avoid a whirling or re-arrangement of the particles of the treatment agent with a gas or liquid current a granular weighting or loading material is provided which, in case the danger of undesirable whirling exists, exerts a force in such a manner upon the treatment agent that the granules of the treatment agent are positively held densely packed. The granular weighting material may be provided in layers between layers of the treatment agent. The weighting material can also be arranged on the side of the treatment agent, if only means are provided that by the positive action of the weighting material the granules of the treatment agent are prevented from being swept away and thus whirled in the described undesirable manner. Also, the weighting material may be provided in the form of finely divided granules which are intermixed with the granules of the treatment agent.

The weighting or loading material in the most elementary case may exert the positive whirling preventing force by means of its own weight. Instead of this feature or additionally to it, the weighting material can also be subjected to pressure itself, for example in hydraulic, pneumatic, mechanical or magnetical manner.

If the weighting material by means of its weight does provide for the force pressing down the granules of the treatment agent, this force positively pressing down the granules of the treatment agent can be altered by altering a liquid level within the region of the weighting material. This alters the buoyancy of the weighting material and thus the entire force acting upon the treatment agent. Also it is possible to have the pressure exerted on the treatment agent by means of tube 29a in FIG. 2. Furthermore the following is possible. The treatment agent may also be present in tube 29b as shown in FIG. 2 and the open end of this tube opens into a container on the left hand side of FIG. 2, which container may be more or less filled with a liquid having a high specific weight, for example quicksilver.

For exerting a direct force in pneumatical or hydraulic manner the current resistance can be used which counteracts the flow of a fluid through the weighting material. The current resistance can be generated within the treatment container or within a container connected further respectively to the treatment container or within the tubing connecting the treatment container in the manner shown in the drawings. It is also possible to have the granules of the weighting material to be of magnetizable material and thus by means of an electro-magnet exert a force in such a manner upon the magnetically attractable granules of the weighting material that these latter granules exert the above mentioned positive force onto the granules of the treatment agent.

Instead of the diaphragm 35 shown in FIGS. 3 and 3a one can also use a piston for mechanically pressing down the weighting material which by means of bodily contact and as shown in FIG. 3a presses down the upper layer of the granules within the treatment agent.

The means for moving the diaphragm, or a respective piston or the like, may be mechanical, hydraulic or pneumatic. Such means as a diaphragm, piston or the like also may serve for compensating shrinking or swelling of the treatment agent during regeneration thereof. It is an advantage that the movable well parts exerting pressure on the weighting granules must not give free the desired large volume for back-flushing because for this purpose other means are possible, so for example flushing out the granules of the weighting or pressurizing material.

In order to allow whirling of the treatment agent, if this is desired in certain method steps, one can provide that the granules of the pressurizing or weighting material have a small specific weight and make them float at some distance above the uppermost regions of the treatment agent so that the necessary space for whirling up the granules of the treatment agent is generated in this way, i.e., so that this volume for allowing whirling exists between the treatment agent itself and the lowermost parts of the pressurizing or weighting material which is afloat above the treatment agent. It is also possible that the treatment agent has a low specific weight so that it can be floated or lifted up afloat on a liquid and the pressurizing material in granular form has a high specific weight and is arranged below the treatment agent. In order to separate the two materials bodily one floats the treatment agent so that the necessary volume for whirling and re-arrangement movement of the treatment agent granules exists below the treatment agent and above the pressurizing material.

A further idea how to allow whirling movement is to carry out the pressurizing or weighting material in the manner shown in the drawings from the treatment container. This necessitates a separate container or the like for taking up the pressurizing or weighting material during back-flushing and whirling of the teratment agent. Only one additional container for taking up the pressurizing or weighting material is necessary in a plant having several treatment containers. It is also possible to have the pressurizing material carried into a different treatment container within the same plant and use it there for holding together the granules of the treatment agent.

In order to allow a whirling and re-arrangement of the granules of the treatment agent one can also leave the pressurizing or weighting material within the treatment container and flush the treatment agent itself out of the container in a furher container and allow whirling by means of respective flushing there. Naturally it is also possible to flush only a part of the treatment agent out of the treatment container and to flush this extracted part in a different container while the remaining part of the treatment agent can be back-flushed including whirling and re-arrangement within the treatment container itself while the pressurizing agent stays within the treatment container.

As already mentioned above, the pressurizing or weighting material may consist of elastically deformable and compressible granules in order to allow compensation of shrinking and swelling of the treatment agent during the regeneration step. If the weighting or pressurizing granules are of non-elastic material, the means shown left hand in FIG. 2 and connencted via tubing 29b allow for an increase or decrease of the volume of weighting or pressurizing material within the container itself. Thus the arrangement of FIG. 2 also allows compensation for swelling and shrinking of the treatment agent, if the granules of material 23 are not resiliently compressible.

The size and shape of the granules within the pressurizing or weighting material is not critical. Conveniently, the size of the granules within the pressurizing and weighting material and within the treatment agent are chosen in such a manner that the smaller size granules cannot penetrate into the spaces between densely packed larger size granules. Furthermore, conveniently, the systems for introducing and extracting liquids and/or gases into the material within the container are surrounded by material having the larger granule size. This allows for providing larger openings in the extraction and/or introduction systems which are not so easily plugged.

Normally the pressurizing or weighting material is a neutral material and is completely, partly or not at all passed by the currents of fluid within the treatment container. However, it is also possible to have the pressurizing or weighting material consist of a material participating in the treatment, i.e., chemical and/or physical reaction subjected to the material passed through the treatment agent. The pressurizing or weighting material can support the treatment agent by having the same chemical and/or physical properties and it is also possible to have it chemically and/or physically reacting in a different manner. This latter case results in a two step treatment apparatus. A treatment of the liquid or gas to be treated by means of the treatment agent as well as the pressurizing or weighting material allows a different treatment of part currents of the same liquid which after having been treated in this way are unified again. This latter feature is generally known in desalting crude water by differently effective ion exchangers. Thus the treatment agent may consist of normal polystyrol and the pressurizing or weighting material may consist of foamed polystyrol which results in having two exchange masses of different specific weight. The foamed material due to its elasticity can compensate swelling and/or shrinking of the other material. If it is desired to regenerate the two different masses separately, one can flush out one of the two materials into a further container and then regenerate the two masses, i.e., one within the treatment container and the other within the further container.

If the pressurizing or weighting material is used for distributing liquids during gassing or degassing, same is used preferably with a very resilient packing with mathematical or irregular shape of the granules which allows by means of a pulsing liquid and/or gas current to knead the packing which results in a very effective cleaning of the packing from adherent dirt particles and the like.

It is known in the treatment of liquids and gasses to arrange the treatment agent in layers of different particle or granule size ranges, which are arranged according to their particle size during back-flushing. The use of the shown means which hold the treatment agent densely packed allows the treatment agent always to be passed by the material to be treated in a direction in which the particle size of the granules decreases, because the rearrangement of the treatment material is prevented. This is a very desirable feature bringing forth some technical advantages. If the current has a direction in which the partcle size of the granules decreases, the current has a stabilizing effect on the position of the different granules relative to one another. In the direction in which the particle size decreases in exchangers the diffusion resistance within the liquid and within the treatment agent decreases, which results in an improved purity of the final product. In filters in the direction of decreasing particle size a real volume filter effect is observed which results in a longer time of use between two successive steps of regeneration, because the coarser dirt particles are already retained within the regions of larger particle size and the region containing the smaller particle size is not soon unduly plugged.

A further advantage of the shown means to positively hold the treatment agent granules in densely packed position is that very high current speeds can be used including vertical horizontal, radial or rotational currents. Pulsing currents can also be used.

What we claim is:

1. Method for effecting treatment of a fluid such as a liquid or gas passing in one direction through a granular treatment agent in a container and regenerating said agent by reversing the flow of fluid, said agent being yieldingly kept under pressure in order to compensate for changes in volume resulting from swelling, shrinking, whirling or the like, by granular pressurizing material of different physical characteristics such as different physical specific gravity, resistance to flow or the like, said granular pressurizing material acting on said treatment agent being a granular material of elastic compressible and expandable porous plastic substance capable to adapt itself in each direction of flow to the changes in volume of said treatment agent and tending in at least one direction of flow to fill the space of said container not occupied by said treatment agent to hold the granules of said granular treatment agent in a densely packed position under various fluid flow conditions.

2. A method according to claim 1, characterized in that the granular pressurizing material is intermixed with the treatment agent.

3. A method as claimed in claim 1, characterized in that within the treatment agent which is held densely packed by said pressurizing material the size of the treatment agent granules decreases in the direction in which said fluid passes through said treatment agent.

4. A method as claimed in claim 3, characterized in that said fluid is extracted from and introduced into those regions of said treatment agent in which the larger particles are arranged.

5. A method as claimed in claim 1, characterized in that other forces besides gravity act on the granules of said pressurizing material, said other forces having at least a component in direction against the treatment agent.

6. A method as claimed in claim 1, characterized in that the pressurizing material is pneumatically urged against said treatment agent.

7. A method as claimed in claim 1, characterized in that said pressurizing material is hydraulically urged in a direction towards said treatment agent.

8. A method as claimed in claim 1, characterized in that said pressurizing material is urged mechanically in a direction towards said treatment agent.

9. A method as claimed in claim 1, characterized in that said pressurizing material is passed by a fluid in such a direction that the passing fluid exerts forces onto said pressurizing material having at least a component in direction towards said treatment agent.

10. A method as claimed in claim 1, characterized in that the two materials consists of matter of different specific weight in order to separate said treatment agent and said pressurizing material and that a level of a liquid is lowered or raised for effectively separating the granules of one material from the granules of the other material.

11. A method as claimed in claim 1, characterized in that said treatment agent and said pressurizing material granules have such characteristics that they create two different resistances to a fluid passing through said material and said agent and this different resistance against allowing passage of fluid is used in order to separate the treatment agent from the pressurizing material.

12. A method as claimed in claim 1, characterized in that said pressurizing material is extracted from the space also containing said treatment agent if not used.

13. A method as claimed in claim 1, characterized in that for reconditioning purposes said pressurizing material is extracted from the space containing said treatment agent and is reconditioned while being separated from said treatment agent.

14. A method as claimed in claim 1, characterized in that said pressurizing material is extracted from said one treatment zone and introduced into another treatment zone.

15. A method as claimed in claim 1, characterized in that said pressurizing material is also a treatment material.

16. A method as claimed in claim 1, characterized in that said pressurizing material brings forth the same effect onto said fluids as the treatment agent.

17. Method of effecting treatment of a fluid in accordance with claim 1, where the pressurizing material is a plastic foam material having granules of treatment agent embedded therein.

18. Method for effecting treatment of a fluid in accordance with claim 1, where the granules of pressurizing material are reconditioned by subjecting them to a kneading effect in a pulsating current of fluid.

References Cited

UNITED STATES PATENTS

| | | | |
|---|---|---|---|
| 1,272,052 | 7/1918 | Kennicott | 210—290X |
| 1,442,348 | 1/1923 | McDermet | 210—290X |
| 1,541,921 | 6/1925 | Caps | 210—290X |
| 2,101,961 | 12/1937 | Slidell | 210—275X |
| 2,723,761 | 11/1955 | Van Der Made et al. | 210—290X |
| 2,302,450 | 11/1942 | Laughlin | 210—275X |
| 3,193,498 | 7/1965 | Platzer et al. | 210—33 |
| 3,382,983 | 5/1968 | Stewart | 210—290X |
| 3,387,630 | 6/1968 | Routson | 210—350X |
| 2,517,051 | 8/1950 | Swenson | 210—289X |
| 3,163,597 | 12/1964 | Thrun | 210—30 |
| 3,240,699 | 3/1966 | Duff et al. | 210—35 |
| 3,276,585 | 10/1966 | Kalinske | 210—279X |

SAMIH N. ZAHARNA, Primary Examiner

U.S. Cl. X.R.

210—290, 350

UNITED STATES PATENT OFFICE
CERTIFICATE OF CORRECTION

Patent No. 3,565,799          Dated February 23, 1971

Inventor(s) Erich Kieschnick, Werner Lux and Max Schulte

It is certified that error appears in the above-identified patent and that said Letters Patent are hereby corrected as shown below:

The name of the third inventor is incorrectly given in the patent as Max Schultz, whereas the correct name is Max Schulte.

Signed and sealed this 1st day of June 1971.

(SEAL)
Attest:

EDWARD M. FLETCHER, JR.        WILLIAM E. SCHUYLER, JR.
Attesting Officer              Commissioner of Patents